United States Patent [19]
Martin et al.

[11] Patent Number: 5,328,674
[45] Date of Patent: Jul. 12, 1994

[54] COMBUSTION GAS DESULFURIZATION METHOD

[75] Inventors: Gérard Martin, Rueil Malmaison; Jean-Louis Bouju, Luzarches, both of France

[73] Assignees: Institut Francais du Petrole, Rueil Malmaison; Babcock Entreprise, La Courneuve, both of France

[21] Appl. No.: 915,697
[22] PCT Filed: Nov. 19, 1991
[86] PCT No.: PCT/FR91/00914
 § 371 Date: Sep. 28, 1992
 § 102(e) Date: Sep. 28, 1992
[87] PCT Pub. No.: WO92/09356
 PCT Pub. Date: Jun. 11, 1992

[30] Foreign Application Priority Data
Nov. 27, 1990 [FR] France .................. 90 14918

[51] Int. Cl.⁵ ............... B01J 8/00; C01B 17/00
[52] U.S. Cl. ..................... 423/244.07; 423/244.08
[58] Field of Search ............... 423/244.07, 244.08

[56] References Cited

U.S. PATENT DOCUMENTS
4,726,940 2/1988 Kobayashi ............... 423/244.08
4,909,161 3/1990 Germain ................... 110/216

FOREIGN PATENT DOCUMENTS
0204193 12/1986 European Pat. Off. .
1526127 3/1970 Fed. Rep. of Germany .
WO89/0366 10/1989 PCT Int'l Appl. .

Primary Examiner—Gregory A. Heller
Attorney, Agent, or Firm—Antonelli, Terry, Stout & Kraus

[57] ABSTRACT

Process for desulfurizing combustion gas wherein the gas is fractionated into at least two flows which pass through distinct passageways (4 and 5) and receive particles of a solid desulfurizing agent coming from distinct injectors (7 and 8). The two particle-charged flows meet (9), are separated again (10 and 11) and meet again thereafter (12). The process can be repeated several times. The final mixture is carried off and fractionated into desulfurized gas and recovered solid particles.

8 Claims, 1 Drawing Sheet

COMBUSTION GAS DESULFURIZATION METHOD

BACKGROUND OF THE INVENTION

This invention relates to a process for desulfurizing combustion gas.

The strict regulations limiting in many countries and many regions the emissions of sulfur oxides through the gaseous effluents of heat generators forbid the use of fuels with a high sulfur content which, besides, may show definite economical advantages: it is the case of some coals having certain similarities to lignites, and of petroleum residues stemming from refining processes.

French patent 2,609,150 describes a process for reducing the emissions of sulfur oxides and particularly the ones of sulfur dioxide coming from a heat generator accepting fuels with a high sulfur content. According to this process, a powdered desulfurizing agent is injected into the combustion gases and the resulting mixture is circulated in a desulfurization zone, then the at least partially desulfurated gases are partly separated from the powdered desulfurizing agent which can be recycled or discharged.

A similar process is described in the French patent application EN. 88/12,363. In this patent application, the mixing of the desulfurizing agent particles with the combustion gases is carried out in a turbulence zone located upstream from the desulfurization zone.

With this type of desulfurization, the rate of use of calcic or magnesian absorbents such as calcium and magnesium oxides and carbonates remains limited. The reason for this phenomenon has not been totally cleared up, but it seems that a skin which partly prevents the reagents from getting into the grains, forms at the surface of these grains.

A process allowing to remedy the drawbacks mentioned above and particularly allowing to obtain high desulfurization rates and to increase the rate of use of the absorbent, at a lower cost, has been discovered.

SUMMARY OF THE INVENTION

More precisely, this invention is directed to a process for desulfurizing combustion gases, wherein a grained (i.e. particulate) desulfurizing agent is injected into a flow or stream of combustion gases, has been discovered; said process comprises the following stages:

(a) fractionating the combustion gas into at least two streams,
(b) adding a particulate desulfurizing agent to each one of the at least two streams,
(c) directing the resulting streams containing particulates of the desulfurizing agent towards one another, in order to cause the meeting and the mixing thereof,
(d) carrying off the resulting mixture of gas and of solid particles,
(e) fractionating the discharged mixture from (d) into at least two streams,
(f) again directing the resulting streams towards one another, in order to cause the meeting and the mixing thereof, and
(g) separating the desulfurized gases from solid particles of the desulfurizing agent.

After the separation, the particles can be recycled if they still show a sufficient desulfurizing power, but this is not always necessary because of the improvement of the rate of use per pass obtained according to the invention.

The grain or particle size of the particles usually ranges from 1 to 100 micrometers, preferably from 2 to 25 micrometers, and the density thereof ranges from 500 to 4,000 kg/m$^3$.

The desulfurization temperature, that is the temperature obtained after mixing the gases with the desulfurizing agent acting as an absorbent, can be selected between 700° and 1,100° C.

An important element is the rate of the flow of the suspension of the gas and of the particles. This rate advantageously ranges from 10 to 80 m/s, preferably from 20 to 30 m/s. These rates lead to turbulence levels which are high enough to provide a homogeneous mixing of the absorbent in the fumes and thereby to obtain high rates of use of the absorbent.

The concentration of the particles in the gas can, for example, range from 0.02 to 1 kg/Nm$^3$, preferably from 0.05 to 0.2 kg/Nm$^3$.

According to a preferred embodiment procedure, additional particles of a desulfurizing agent are injected in the flows of stage (f) and the resulting mixture of gas and particles is carried off following a direction substantially perpendicular to the one of said flows. Stage (g) is carried out thereafter.

It is clear that the carrying off of the gases at each stage of the process where such a discharge is planned, is performed following the normal direction of flow of the combustion gases, that is from the combustion zone towards the zone of discharge of the gases of the process.

After stage (f), the suspension of particles in the gas can advantageously be let flow into a downstream zone, which is not in accordance with the features mentioned above, for example in a zone with a circular or a square section that can, if need be, comprise elements modifying the direction of flow of the suspension, before carrying out the separation treatment of stage (g). The residence time in this downstream zone can for example range from 0.1 to 2 s, preferably from 0.5 to 1 s.

The mixing of the particles with the gas (stage b) is preferably carried out by injecting into the flows of combustion gas a preformed suspension of solid particles in an auxiliary gas flow, which can itself be a combustion gas or a recycled gas.

In this case, the rate of injection of the preformed suspension can for example range from 20 to 150 m/s, preferably from 50 to 100 m/s.

In case of a recycling of the particles, the particles can either be recycled as they are, or they can be subjected to a well-known treatment for separating undesirable elements such as calcium or magnesium sulfate, or to a treatment for regenerating the absorbent, that is to say which increases the specific surface of the partly sulfated absorbent.

Ammonia or urea can be introduced into the desulfurization chamber, preferably upstream, to complete if need be the denitrification of the combustion effluents. Air can also be added so that the desulfurization is performed in an oxygen atmosphere, if the combustion stage is not carried out with excess air.

The absorbents which are the most frequently used as desulfurizing agents are oxides, hydroxides and carbonates of alkaline earth metals, for example limestones ($CaCO_3$), hydrated limes ($Ca(OH)_2$) or dolomites ($CaMg(CO_3)_2$). Fine-grain products from the cement industry can also be utilized before they are baked.

They can be injected into a flow of gas such as air or steam or suspended in a liquid such as water.

Venturi tubes or other devices favouring an additional turbulence can be used in the axis of injectors 7 and 8, as mentioned in French patent application EN 88/12,363.

BRIEF DESCRIPTION OF THE DRAWINGS

The invention and the advantages thereof will be clear from reading the description hereafter given by way of a non limitative example, with reference to the accompanying drawings in which.

DESCRIPTION OF THE PREFERRED EMBODIMENTS

Figure 1:
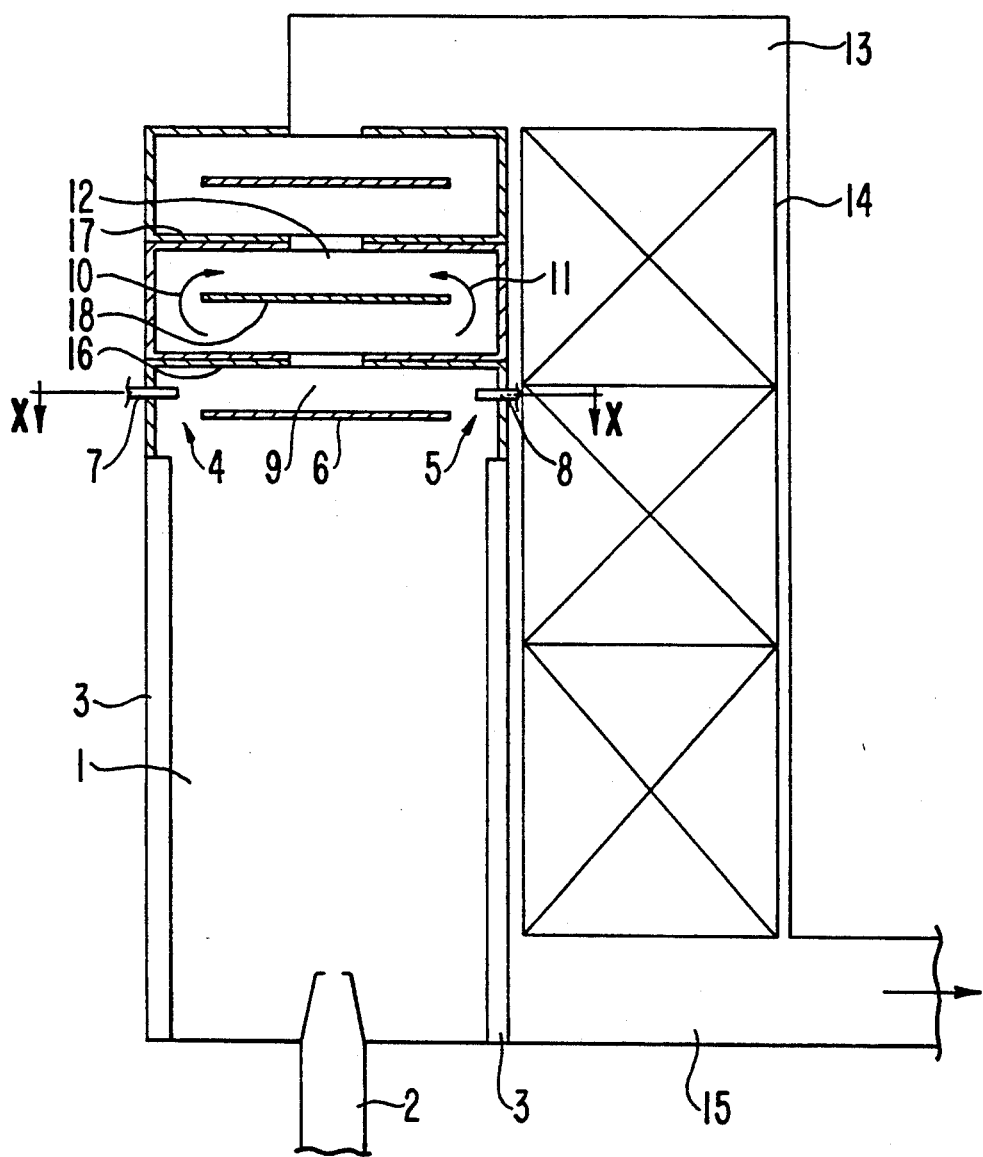
FIG. 1 is a longitudinal section of a device according to the invention.

This figure shows a device comprising an elongated combustion chamber (1) with a square or a rectangular section, preferably horizontal, which can burn any type of solid or liquid fuel containing sulfur and eventually nitrogen, injected in a pulverized form into the chamber (1) by a burner (2) which also receives an oxidizing gas such as air. This burner is advantageously arranged following the axis of the chamber and at the lower end thereof. A plurality of burners can also be used instead of a single burner.

The fuel can be for example a vacuum residue, a fluxed asphalt, a solid fuel, a composite fuel oil/coal fuel or a coal/water suspension.

The fuel is preferably burnt without excess air or with very little excess air, in order to reduce at the maximum the forming of nitrogen oxides.

During the combustion, a part of the energy released is advantageously drawn through exchange pipes such as (3) so that the temperature of the combustion gaseous effluents ranges between 700° C. and 1,200° C. These effluents leave the chamber (1) through two passageways (4 and 5) delimited by a plate (6) and are sent back towards one another at the level XX' after receiving solid particles coming from the injectors (7 and 8). The connection of the injectors to the source of solid particles is not shown.

When the two opposite flowing streams meet in zone (9), an intense stirring or mixing occurs, thereby favouring homogenous distribution of the particles in the total effluents.

The particle suspension leaves zone (9) in a direction substantially perpendicular to the direction of flow of one of the suspension streams at the level XX' by passing through the passageway(s) provided in the plates or panels (16). This stream of gas-particle suspension is once more separated in two opposite streams (10 and 11) which run into one another again in zone (12). This can be repeated once, as shown on FIG. 1, or more. Plates or panels (17) comprising passageways for the suspension separate each level, and plates such a (18) allow to separate the streams. The suspension of particles in the gas passes thereafter into zone (13), where the desulfurization process continues, and then in contact with the pipes or the plates of a heat-recovery boiler (14). The suspension is discharged through line (15). The solid particles can be separated from the gas thereafter, as shown on the figure of French patent application EN 88/12,363.

The recovered particles can be partly sent back into the injectors (7) and (8).

Figure 2:
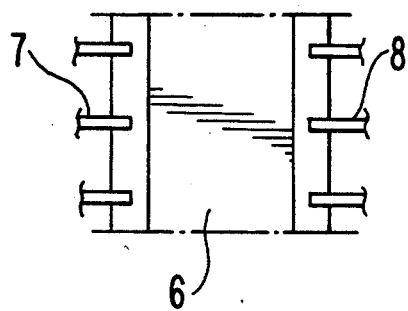
FIGS. 2 and 3 are cross-sections of two embodiment variants of the device according to the invention.

The injectors (7 and 8) and the deflecting plate (6) can be seen on FIG. 2, which is a cross-section of FIG. 1 following XX'.

Figure 3:
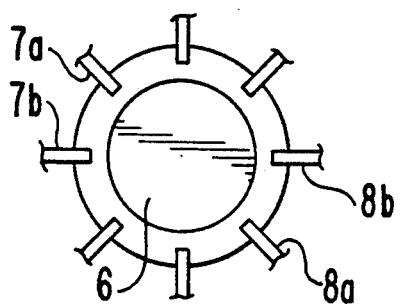

The boiler can also have a circular section. In this case (FIG. 3), a series of injectors such as 7a, 7b, ... can be arranged opposite injectors 8a, 8b, ..... The plate can then be circular.

We claim:

1. A process for desulfurizing combustion gas wherein solid particles of a desulfurizing agent are injected into a combustion gas and wherein said desulfurizing agent comprises oxides, hydroxides or carbonates of alkaline earth metals, said process comprising the following stages:
   (a) fractionating a stream of the combustion gas into at least two gas streams;
   (b) introducing solid particles of the desulfurizing agent into each one of the at least two streams;
   (c) directing streams containing particles of the desulfurizing agent suspended in the combustion gas resulting from stage (b) towards one another, in order to cause meeting of the streams and mixing thereof in a mixing zone;
   (d) discharging a resulting mixture of gas and of particles of the desulfurizing agent from said mixing zone to another zone;
   (e) fractionating the discharged mixture in said another zone into at least two additional streams, each additional stream being formed by combustion gas and particles of the desulfurizing agent;
   (f) directing the streams resulting from stage (e) towards one another in order to cause the meeting of the streams and mixing thereof; and
   (g) fractionating the mixture resulting from stage (f) into a gas, at least partially desulfurized, and into sulfur-enriched particles of said desulfurizing agent; the size of the particles of the desulfurizing agent ranging from 1 to 100 micrometers, the rate of flow of the streams meeting in stage (c) ranging from 10 to 80 m/s and the combustion gas resulting from combustion of a sulfur-containing fuel.

2. A process according to claim 1, wherein the size of the particles of the desulfurizing agent ranges from 2 to 25 micrometers.

3. A process according to claim 1, wherein the rate of flow of the streams when they meet in stage (f) ranges from 10 to 80 m/s.

4. A process as claimed in claim 1, wherein stages (e) and (f) are repeated several times.

5. A process according to claim 1, wherein the particles of the desulfurizing agent are also added to the streams directed to one another in stage (f).

6. A process according to claim 1, wherein the mixing of the particles of the desulfurizing agent with each one of the at least two streams in stage (b) is performed by injecting into each one of the streams of combustion gas a preformed suspension of the particles of said desulfurizing agent in an auxiliary gas flow, said suspension being injected at a rate of 50 to 100 m/s.

7. A process according to claim 1, wherein the desulfurizing agent is selected from the group consisting of limestone, hydrated lime and dolomite.

8. A process according to claim 1, wherein the temperature of the combustion gas ranges between 700° C. and 1200° C. at stage (b).

* * * * *